(12) United States Patent
Lillie et al.

(10) Patent No.: US 8,970,577 B2
(45) Date of Patent: Mar. 3, 2015

(54) REDUCING DISPLAY ARTIFACTS AFTER NON-DISPLAY UPDATE PERIODS

(71) Applicant: Synaptics Incorporated, San Jose, CA (US)

(72) Inventors: Jeffrey S. Lillie, Mendon, NY (US); John Childs, Rochester, NY (US); Marshall J Bell, Austin, TX (US); Thomas Mackin, Rochester, NY (US)

(73) Assignee: Synaptics Incorporated, San Jose, CA (US)

( * ) Notice: Subject to any disclaimer, the term of this patent is extended or adjusted under 35 U.S.C. 154(b) by 171 days.

(21) Appl. No.: 13/801,999

(22) Filed: Mar. 13, 2013

(65) Prior Publication Data

US 2014/0267217 A1    Sep. 18, 2014

(51) Int. Cl.
*G09G 3/20* (2006.01)

(52) U.S. Cl.
CPC ........................................ *G09G 3/20* (2013.01)
USPC ........................................................... 345/214

(58) Field of Classification Search
None
See application file for complete search history.

(56) References Cited

U.S. PATENT DOCUMENTS

| | | | |
|---|---|---|---|
| 5,534,892 A | 7/1996 | Tagawa | |
| 5,896,120 A | 4/1999 | Iguchi et al. | |
| 6,239,788 B1 | 5/2001 | Nohno et al. | |
| 2004/0217945 A1 | 11/2004 | Miyamoto et al. | |
| 2006/0012575 A1 | 1/2006 | Knapp et al. | |
| 2006/0214918 A1* | 9/2006 | Destura et al. | 345/173 |
| 2006/0236029 A1* | 10/2006 | Corrado et al. | 711/114 |
| 2008/0062139 A1 | 3/2008 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2008/0238867 A1* | 10/2008 | Maeda et al. | 345/107 |
| 2009/0213042 A1* | 8/2009 | Hagino et al. | 345/55 |
| 2009/0256868 A1* | 10/2009 | Low et al. | 345/691 |
| 2010/0001973 A1 | 1/2010 | Hotelling et al. | |
| 2010/0193257 A1 | 8/2010 | Hotelling et al. | |
| 2010/0194695 A1 | 8/2010 | Hotelling et al. | |
| 2010/0194696 A1 | 8/2010 | Chang et al. | |
| 2010/0194697 A1 | 8/2010 | Hotelling et al. | |
| 2010/0194698 A1 | 8/2010 | Hotelling et al. | |
| 2011/0050585 A1 | 3/2011 | Hotelling et al. | |
| 2011/0210939 A1 | 9/2011 | Reynolds et al. | |

(Continued)

OTHER PUBLICATIONS

International Search Report and Written Opinion dated May 29, 2014, for Application No. PCT/US2014/016577.

*Primary Examiner* — Peter Vincent Agustin
(74) *Attorney, Agent, or Firm* — Patterson + Sheridan, LLP

(57) ABSTRACT

Embodiments of the present invention generally provide a processing system for a display device having an integrated sensing device. The processing system includes a driver module coupled to a plurality of source lines and a plurality of transmitter electrodes. Each transmitter electrode includes one or more common electrodes configured for display updating and input sensing. The driver module is configured for selecting a first display line for display updating and driving the sources lines with first display update signals to update the first display line. The drive module is further configured for driving a first transmitter electrode of the plurality of transmitter electrodes for input sensing during a non-display update period and driving the source lines with restore signals during a restart period. The processing system further includes a receiver module coupled to a plurality of receiver electrodes and configured for receiving resulting signals with the receiver electrodes.

20 Claims, 8 Drawing Sheets

(56) References Cited

U.S. PATENT DOCUMENTS

| | | |
|---|---|---|
| 2011/0210940 A1 | 9/2011 | Reynolds |
| 2011/0210941 A1 | 9/2011 | Reynolds et al. |
| 2011/0227889 A1* | 9/2011 | Choi .......................... 345/209 |
| 2011/0267305 A1 | 11/2011 | Shahparnia et al. |
| 2011/0285683 A1 | 11/2011 | Todorovich et al. |
| 2012/0212521 A1* | 8/2012 | Yamauchi et al. ............ 345/690 |
| 2012/0218246 A1* | 8/2012 | Ueda et al. ................... 345/211 |
| 2012/0249476 A1 | 10/2012 | Schwartz et al. |
| 2013/0021309 A1 | 1/2013 | Kothari et al. |
| 2013/0057511 A1 | 3/2013 | Shepelev et al. |
| 2013/0342481 A1* | 12/2013 | Small et al. ................... 345/173 |
| 2014/0267217 A1* | 9/2014 | Lillie et al. ................... 345/214 |

* cited by examiner

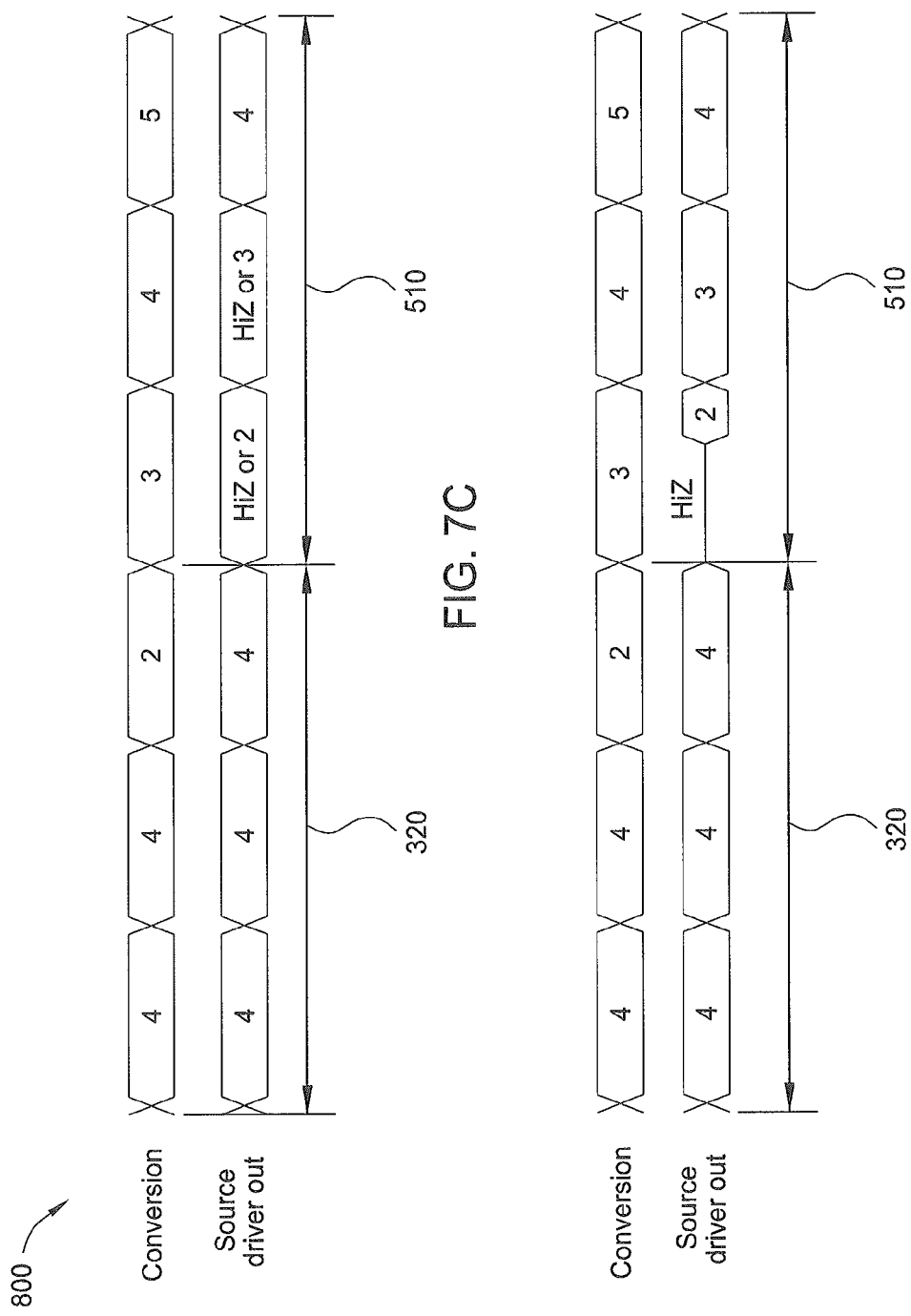

REDUCING DISPLAY ARTIFACTS AFTER NON-DISPLAY UPDATE PERIODS

DESCRIPTION OF THE RELATED ART

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Proximity sensor devices may include one or more types of electrodes configured for both updating display lines and transmitting input sensing signals. In such shared electrode configurations, display updating and input sensing may be performed during separate time periods in order to reduce the likelihood of interference between these processes. For example, transmitting input sensing signals while updating display lines may generate display artifacts. Similarly, driving shared electrodes to update the display while performing input sensing may corrupt acquired sensing data. Accordingly, display updating may be periodically stopped (e.g., during a blanking period) to perform input sensing and resumed once input sensing is complete. However, repeatedly interrupting the process of updating display lines may result in display artifacts (e.g., banding). Such artifacts are particularly prevalent with respect to the display lines that are updated right after input sensing is stopped and display updating is resumed.

Therefore, there is a need for a system and method for reducing display artifacts when exiting a blanking period in shared electrode devices.

SUMMARY OF THE INVENTION

Embodiments of the present invention generally provide a processing system for a display device having an integrated sensing device. The processing system includes a driver module having driver circuitry. The driver module is coupled to a plurality of source lines and a plurality of transmitter electrodes. Each transmitter electrode includes one or more common electrodes configured for display updating and input sensing. The driver module is configured for selecting a first display line for display updating during a first display update period, and driving the sources lines with first display update signals during the first display update period to update the first display line. The driver module is further configured for driving a first transmitter electrode of the plurality of transmitter electrodes for input sensing during a non-display update period, and driving the source lines with restore signals during a restart period. The restart period is after the non-display update period and before a second display update period. The processing system further includes a receiver module coupled to a plurality of receiver electrodes and configured for receiving resulting signals with the receiver electrodes when the first transmitter electrode is driven for input sensing.

Embodiments of the present invention further provide a method of input sensing with a display device integrated with a sensing device having a plurality of source lines, a plurality of receiver electrodes, and a plurality of transmitter electrodes, each transmitter electrode comprising one or more common electrodes. The method includes selecting a first display line for display updating during a first display update period, and driving the sources lines with first display update signals during the first display update period to update the first display line. The method further includes driving a first transmitter electrode of the plurality of transmitter electrodes for input sensing during a non-display update period, and receiving resulting signals with the receiver electrodes when the first transmitter electrode is driven for input sensing. The method further includes driving the source lines with restore signals during a restart period. The restart period is after the non-display update period and before a second display update period.

Embodiments of the present invention further provide an input device including a display device having an integrated sensing device. The input device includes a plurality of source lines, a plurality of transmitter electrodes, a plurality of receiver electrodes, and a processing system coupled to the source lines, transmitter electrodes, and receiver electrodes. Each transmitter electrode includes one or more common electrodes configured for display updating and input sensing. The processing system is configured to select a first display line for display updating during a first display update period, and drive the sources lines with first display update signals during the first display update period to update the first display line. The processing system is further configured to drive a first transmitter electrode of the plurality of transmitter electrodes for input sensing during a non-display update period, and receive resulting signals with the receiver electrodes when the first transmitter electrode is driven for input sensing. The processing system is further configured to drive the source lines with restore signals during a restart period. The restart period is after the non-display update period and before a second display update period.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

FIGS. 7A-7D illustrate the conversion and storage of source line data values during the distributed blanking period and restart period in accordance with embodiments of the invention.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for driving display elements (e.g., source lines, common electrodes, etc.) to restore a display device to a desired state following a non-display update period (e.g., following an input sensing period). Restoring the device to a desired state may include driving the display elements with one or more display line values that were driven to the display elements prior to the non-display update period. In other embodiments, display elements may be driven with a reference voltage (e.g., a ground voltage, a gray-level voltage, etc.), or the display elements may be coupled to a high-impedance ("Hi-Z") circuit in order to reduce the rate at which the display elements are discharged. Advantageously, by restoring the display device to a desired state after a non-display update period, the likelihood of producing display artifacts may be reduced.

Figure 1:
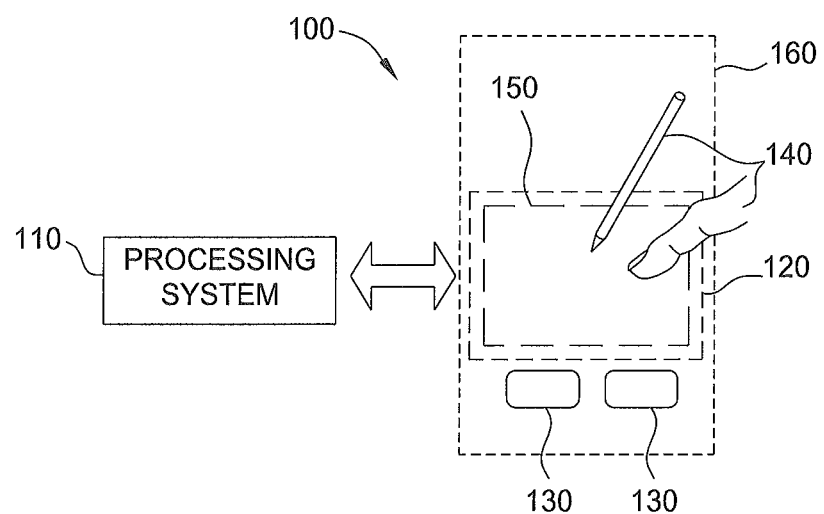
FIG. 1 is a block diagram of an exemplary input device in accordance with embodiments of the invention.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I²C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., "V-com electrode") used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrode. In addition, other display elements, such as source drivers, gate select lines, storage capacitors, and the like, may be used to perform capacitive sensing.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes.

In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As one example, a common electrode may be utilized to update a display line during a display update period and utilized to perform input sensing during a non-display period. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
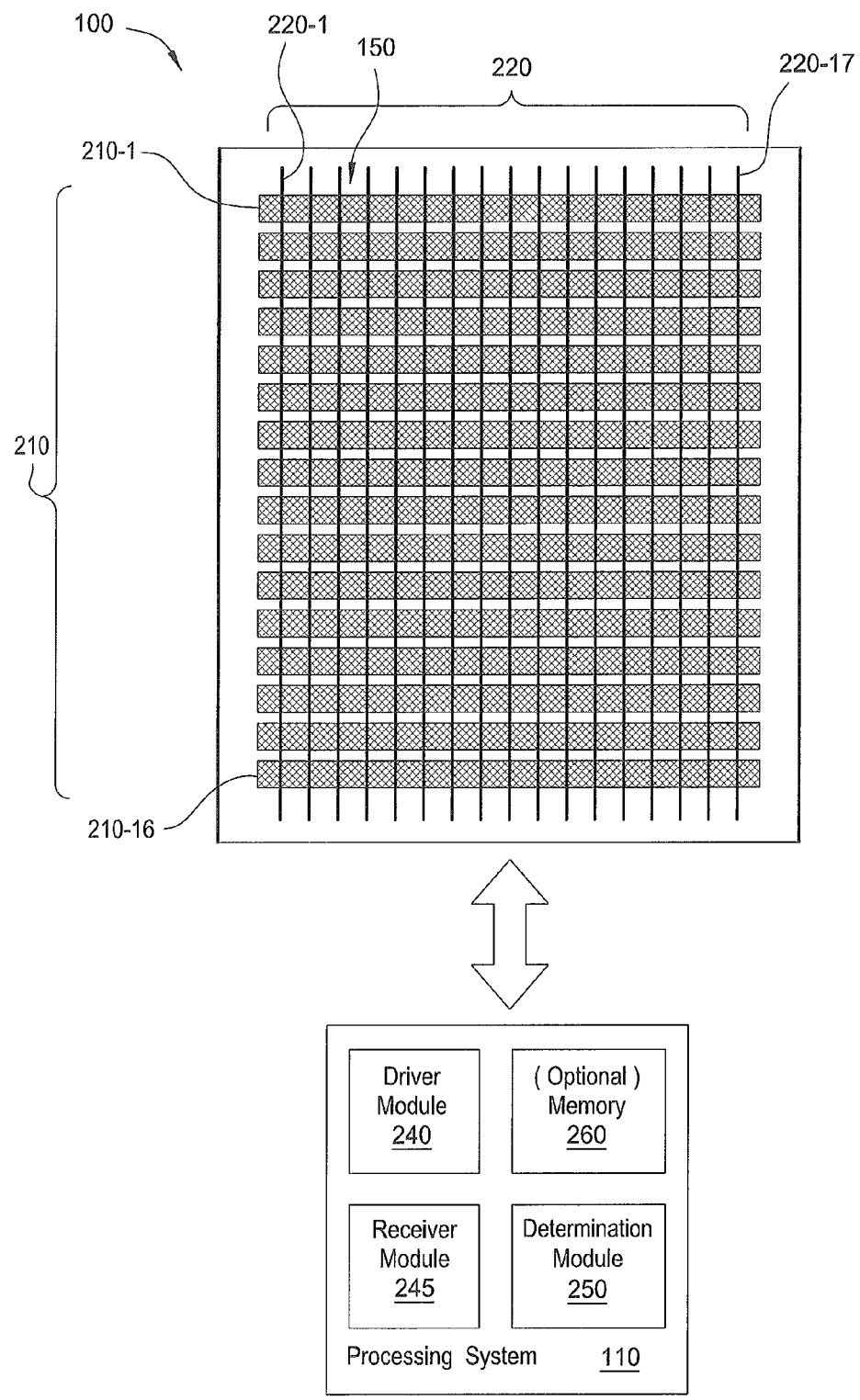
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150 and processing system 110. The array of sensing elements 150 includes a plurality of transmitter electrodes 210 (e.g., 210-1, 210-2, 210-3, etc.) and a plurality of receiver electrodes 220 (e.g., 220-1, 220-2, 220-3, etc.). Each transmitter electrode 210 may comprise one or more common electrodes. Additionally, in various embodiments, each receiver electrode 220 may comprise one or more common electrodes. The processing system 110 is coupled to the array of sensing elements 150, for example, through one or more routing traces.

Although the processing system 110 is illustrated in FIG. 2 embodied as a single integrated circuit (IC), the input device 100 may include any appropriate number of ICs comprising the processing system 110. As shown in FIG. 2, the processing system 110 may include a driver module 240, a receiver module 245, a determination module 250, an optional memory 260, and/or a synchronization mechanism (not shown in FIG. 2).

The receiver module 245 is coupled to the plurality of receiver electrodes 220 and configured to receive resulting signals from the receiver electrodes 220 indicative of input (or lack of input) in the sensing region 120 and/or of environmental interference. The receiver module 245 may also be configured to pass the resulting signals to the determination module 250 for determining the presence of an input object and/or to the optional memory 260 for storage.

The driver module 240, which includes driver circuitry, may be configured for updating images on the display screen of the display device 160. For example, the driver circuitry may be configured to apply one or more pixel voltages to the display pixel electrodes through pixel source drivers. The driver circuitry may also be configured to apply one or more common drive voltages to the common electrodes to update one or more display lines of the display screen. In addition, the processing system 110 is configured to operate the common electrodes as transmitter electrodes for input sensing by driving transmitter signals onto the common electrodes.

The functions of the processing system 110 may be implemented in more than one IC to control the display module elements (e.g., common electrodes) and drive transmitter signals and/or receive resulting signals received from the array of sensing elements 150. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The receiver sensor electrodes may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Input Sensing During Non-Display Update Periods

In various embodiments, the common electrodes and/or other display elements (e.g., gate select lines, source lines, storage capacitors, etc.) may be used both to update the display and to perform input sensing. In order to reduce the likelihood of interference between these processes, display updating and input sensing may be performed during separate time periods.

In one example, input sensing may be performed during non-display update periods (e.g., sensing periods, input sensing periods or capacitive sensing periods) referred to as "blanking" periods or "distributed blanking" periods. These non-display update periods, also referred to as horizontal-blanking periods, long horizontal-blanking ("long h-blank") periods, vertical-blanking periods, in-frame blanking periods, etc., occur between display line and/or display frame updates. For example, a horizontal-blanking period may refer to the non-display update period that occurs after updating display line N, but before updating display line N+1, during which the display elements may be altered to update display line N+1. Further, a long horizontal-blanking period may be generated by redistributing multiple horizontal-blanking periods, at least a portion of the vertical blanking periods, or some combination of the two, and combining the periods into a single non-display update period. For example, a long horizontal-blanking period may be generated by removing the non-display update periods that may occur between multiple display line updates and combining the non-display update periods into a single non-display update period. In one embodiment, a long horizontal-blanking period (or a sensing period) may be a non-display update period that is at least as long as the duration of a display line update period. In another embodiment, a long horizontal-blanking period may be a non-display update period (or a sensing period) that is longer than the duration of a display line update period.

Figure 3:
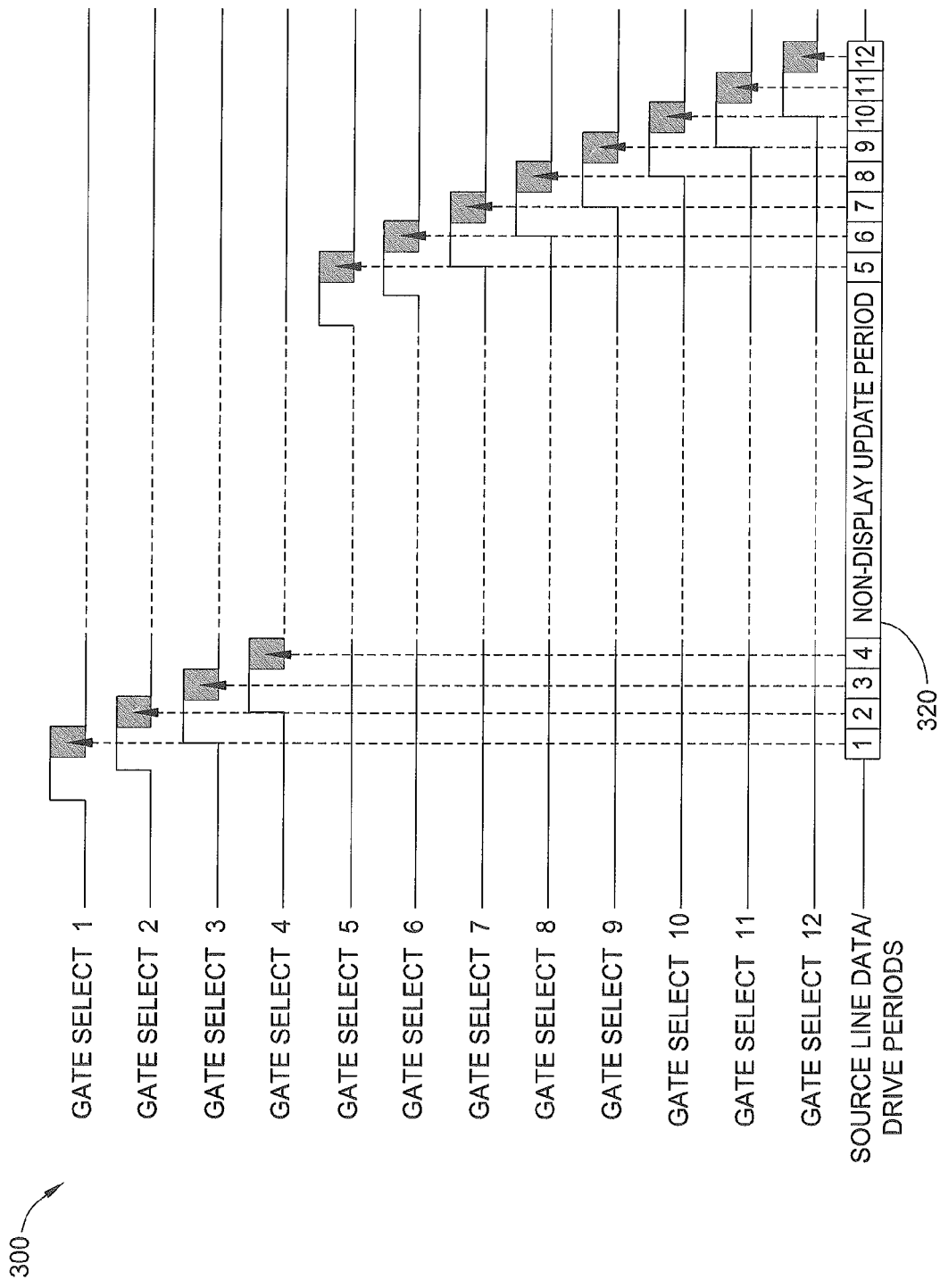
FIG. 3 illustrates a technique for driving select lines and source lines of the input device during display update periods and performing input sensing during a non-display update period in accordance with embodiments of the invention.

FIG. 3 illustrates a technique for driving select lines (shown as gate select lines) and source lines of the input device 100 during display update periods and performing input sensing during a non-display update period in accordance with embodiments of the invention. Each select line may be driven to select a particular display line (e.g., a row of pixels) for updating. An entire row of pixels may be selected for updating by a single select line. Once a display line is selected, pixel data is driven to the pixels associated with the selected display line through a plurality of source lines driven with source line data to update the display line. After the display line is updated, the display line is deselected, the next display line is then selected, and pixel data associated with the next display line is driven to the next row of pixels through the source lines. This process is repeated until every line in the display device 160 has been updated.

As discussed above, the non-display update periods which may occur after each display line update may be redistributed and/or combined to form sensing periods 320. An exemplary sensing period 320 is shown in FIG. 3. During the sensing period 320, display updating is stopped, and input sensing may be performed. After the sensing period 320, display updating may resume, for example, by sequentially selecting and driving additional display lines (e.g., lines 5, 6, 7, etc.) for updating.

Sensing periods 320 may be used with a variety of display types, including displays utilizing slow-switching transistors and displays utilizing fast-switching transistors. In one embodiment, a slow-switching transistor is any type of transistor that, when utilized in a gate select line for a display line, does not fully "open" or "activate" when the source lines are driven to update the display line. One exemplary type of slow-switching transistor is amorphous silicon or "a-Si" transistors. One exemplary type of fast-switching transistor is low-temperature polycrystalline silicon (LTPS) transistors. In some embodiments, a fast-switching transistor in one display device may be considered a slow-switching transistor in another display device. However, in contrast to fast-switching transistor displays, which enable display lines to be selected and updated relatively quickly, slow-switching transistor displays may experience a time delay ($T_{turn-on}$) between the time at which a select signal is first driven to select a display line and the time at which the corresponding row of transistors reaches a sufficient voltage level ($V_{on}$), such that pixel data can be driven to the display line. Consequently, various approaches may be used when selecting and driving slow-switching transistors display. One such approach, referred to as "pipelining," is illustrated in FIG. 4, discussed below.

Figure 4:
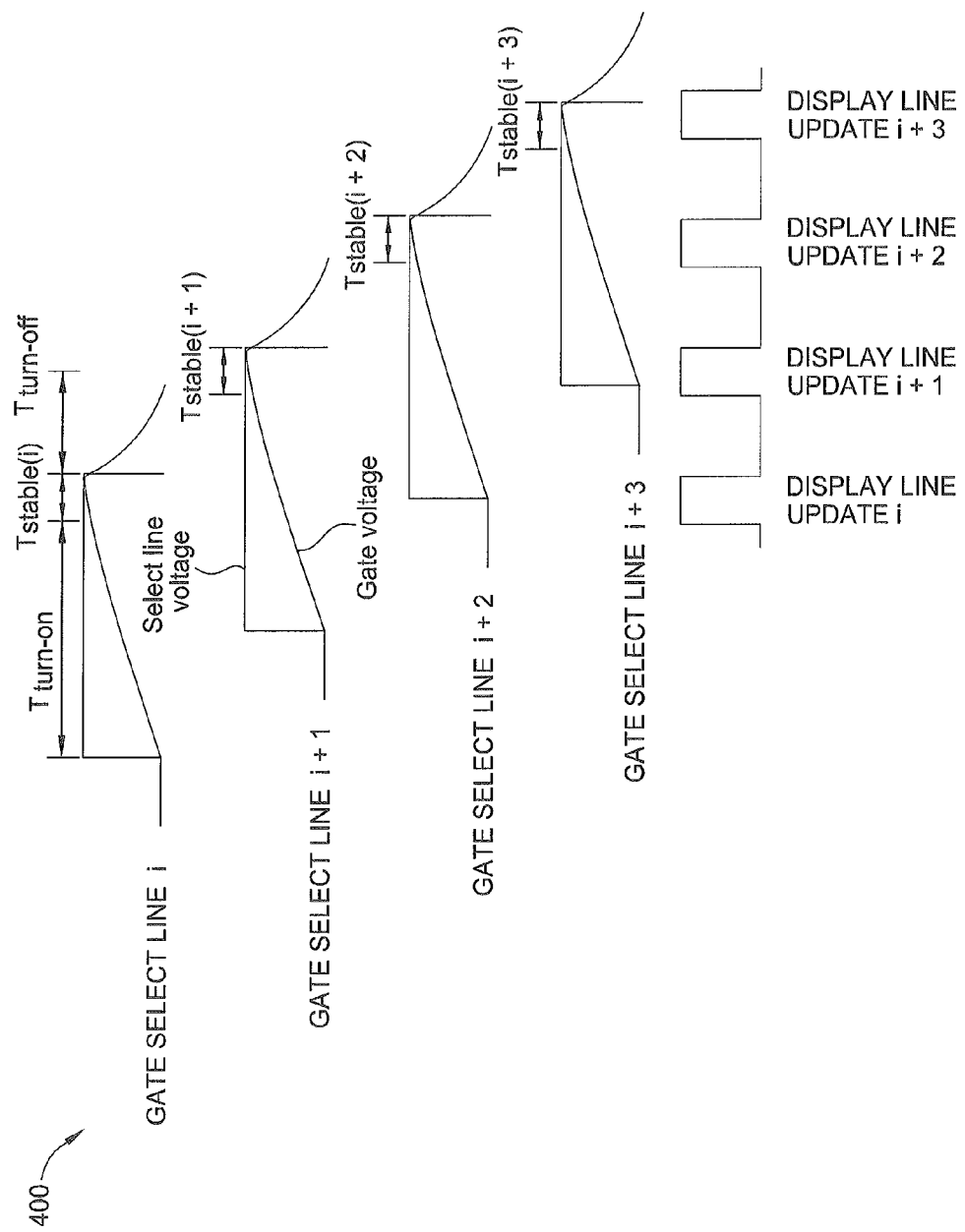
FIG. 4 illustrates a technique for selecting and driving slow-switching transistors for display updating in accordance with embodiments of the invention.

FIG. 4 illustrates a technique for selecting and driving slow-switching transistors for display updating in accordance with embodiments of the invention. As shown in FIG. 4, the transistor(s) associated with each display line may experience a time delay between the time at which the select line is driven with a select voltage and the time at which the gate voltage reaches a turn-on voltage. Once the gate voltage reaches the turn-on voltage, a display line update may be performed by driving the source lines with pixel data. Further, as shown, signals driven to the select lines may be pipelined. That is, the select lines may be driven in a sequential and overlapping manner in order to compensate for transistor turn-on time delays ($T_{turn-on}$).

Although inserting sensing periods, such as sensing period 320, allows various electrodes and display elements (e.g., common electrodes, select lines, source lines, etc.) to be operated for input sensing, display panels are not intended to be used in this manner. As a result, repeatedly interrupting the process of display updating may result in display artifacts. For example, stopping the process of display updating to perform input sensing may cause display elements (e.g., electrodes, traces, capacitors, etc.) to discharge during the sensing period, placing the system in an unexpected state once display updating is resumed. Consequently, display lines that are updated after exiting a sensing period may exhibit artifacts (e.g., banding) until the display elements are recharged to an appropriate level.

Reducing Display Artifacts after Non-Display Update Periods

Following a distributed blanking period, one or more display elements (e.g., source lines, common electrodes, etc.) may be driven to restore the display device 160 and/or input device 100 to a desired state. Restoring the device to a desired state may include driving the display elements with signals that are based on one or more signals driven to the display elements prior to the sensing period. For example, following the sensing period, the source lines may be driven with one or more data values (e.g., pixel values) previously used to update the display lines. In other embodiments, display elements, such as the source lines, may be driven with a reference voltage (e.g., a ground voltage, a gray-level voltage, etc.), or the display elements may be coupled to a high-impedance ("Hi-Z") circuit, for example, in order to reduce the rate at which the display elements are discharged. Moreover, any combination of the aforementioned techniques may be used. For example, following a sensing period, the source lines may be coupled to a high-impedance circuit and subsequently driven with previous data values and/or a reference voltage before driving a new display line for updating.

Driving display elements with previously-used data values, signals based on previously-used data values, and/or reference voltage(s) may place the input device 100 in a state that is similar to the state the device was in prior to the distributed blanking period, reducing the likelihood of display artifacts once display updating is resumed. Exemplary techniques for restoring the input device 100 to a desired state are discussed below with respect to FIGS. 5A-7D.

Figure 5A:
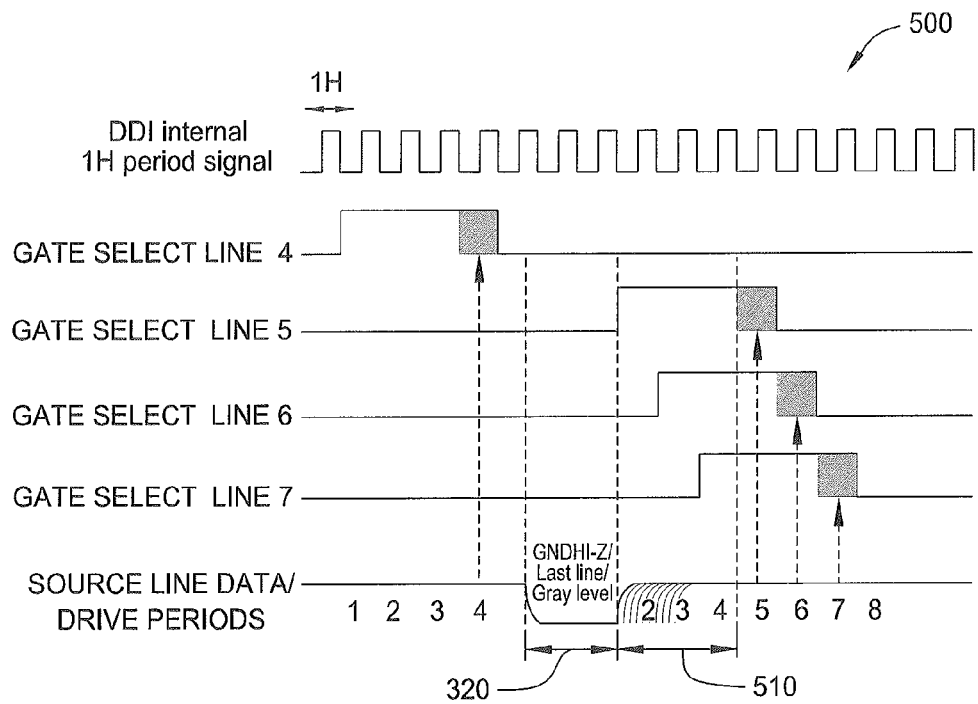
FIGS. 5A and 5B illustrate techniques for restoring display elements of the input device to a desired state following the distributed blanking period of FIG. 3 in accordance with embodiments of the invention.
Figure 5B:
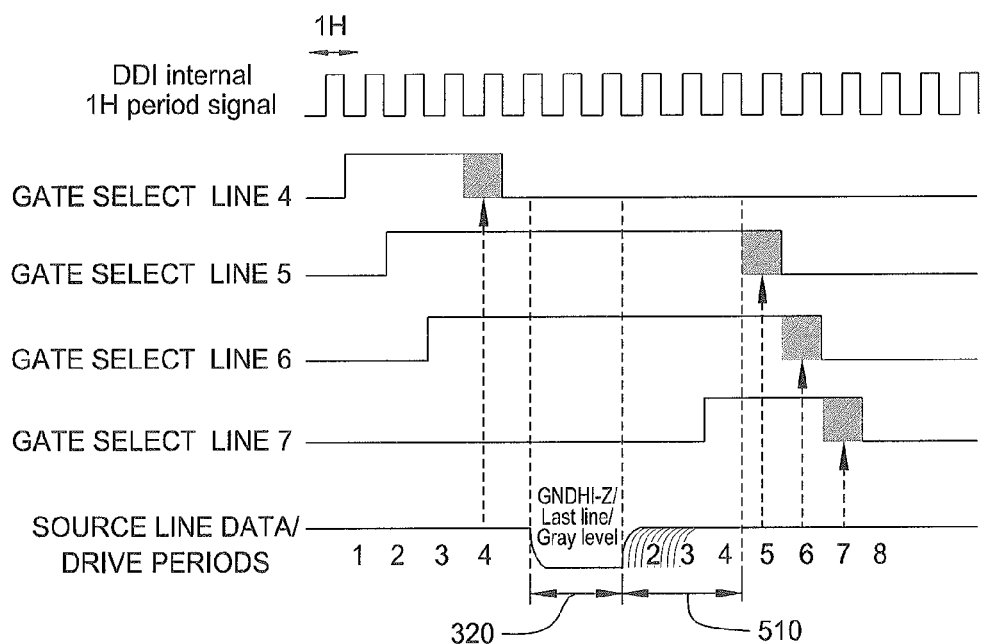

FIGS. 5A and 5B illustrate techniques for restoring display elements of the input device 100 to a desired state following the sensing period 320 of FIG. 3 in accordance with embodiments of the invention. Although the techniques illustrated in FIGS. 5A and 5B are described with respect to a slow-switching display device, the techniques are equally applicable to other display technologies (e.g., fast-switching display devices). For example, the techniques illustrated in FIGS. 5A and 5B may be used with fast-switching display devices that do not select display lines for updating in a pipelined manner.

As shown in FIG. 5A, after selecting and driving display line 4 with source line data during a first display update period, the input device 100 may enter a non-display update period (e.g., sensing period 320), during which one or more transmitter electrodes 210 and receiver electrodes 220 may be operated for input sensing. Following the sensing period 320, the input device 100 may enter a restart period 510. During the restart period 510, the source lines may be driven with signals that are based on, or substantially identical to, signals sent to the display line(s) that were updated prior to the non-display update period. For example, the source lines may be driven with one or more source line data values previously driven to one or more display lines. In the embodiment shown in FIG. 5A, three previous source line data values (e.g., signals based on data values previously-driven to display lines 2, 3 and 4) are repeated. Then, after the restart period 510, display lines 5, 6, and 7 are selected and updated during a second display update period.

Although signals associated with three previous data values are repeated during the restart period 510 in this embodiment, any number of source line data values may be repeated during a restart period 510. However, as will be understood by those of ordinary skill in the art, the number of source line data values that are repeated following a sensing period may be limited by the characteristics of the registers, buffers, and/or digital-to-analog converter(s) (DACs) in which the data values are stored and/or converted. Additionally, the number of source line data values that are repeated may depend on the switching speed of the transistors to which the select lines are coupled. For example, slower transistor switching speeds may allow time for more source line data values to be repeated before a display line is fully-selected and available for display updating. Further, the duration of the restart period 510 may be limited by the time allotted for each display frame update period and sensing frame update period and/or the time required to perform display updating.

As described with respect to FIG. 4, above, selection of the display lines (e.g., display lines 5, 6 and 7) may be pipelined, that is, the display lines may be selected in a sequential and overlapping manner, as shown in FIG. 5A. For example, display lines 5, 6 and 7 may be selected in a delayed manner such that the transistors corresponding to the display lines reach an 'on' state at different times, enabling each display line to be separately updated by source drivers coupled to the source lines. This technique is illustrated in FIGS. 5A and 5B. After the restart period 510, the gate select line associated with display line 5 is driven first, followed by the gate select line associated with display line 6, and followed by the gate select line associated with display line 7. The source lines are then driven with source line data for display line 5 once the transistors associated with display line 5 reach an 'on' state. Display line 5 is then deselected, and the gate select line associated with display line 8 (not shown) may be driven. The pipelining process may be repeated until all display lines have been updated or until another sensing period 320 occurs.

Although the non-display update periods and restart periods 510 are shown as separate periods in FIGS. 5A and 5B, these periods may overlap. For example, display lines may be selected during the non-display update periods (e.g., sensing periods 320). Additionally, the source lines may be coupled to a high-impedance circuit and/or driven with a reference voltage during all or part of the non-display update periods. One embodiment of this technique is shown in FIG. 5B, discussed below.

FIG. 5B illustrates another technique for restoring display elements of the input device 100 to a desired state. However, in contrast to the technique discussed with respect to FIG. 5A, one or more display lines selected prior to the sensing period 320—and scheduled to be updated after the sensing period 320—may remain selected during the sensing period 320. For example, prior to the sensing period 320, gate select lines associated with display lines 5 and 6 were driven with select signals. These display lines may remain selected during the sensing period 320, and the pixel values associated with the selected display lines may be affected by the signals applied to the source lines during the sensing period 320 and/or restart period 510.

In one embodiment, during the sensing period 320 and restart period 510, the source lines are driven with source line data values associated with the last display line updated prior to entering the sensing period 320 (e.g., source line data for display line 4 in FIG. 5B). In another embodiment, during the sensing period 320, the source lines are driven with the source line data values of the last updated display line, and, after the sensing period 320, display updating is resumed starting at the next display line (e.g., display line 5 in FIG. 5B). Thus, in this embodiment, the display elements remain charged during the sensing period 320, no restart period 510 is observed, and display updating is resumed after the sensing period 320.

In the embodiments described above, source line data associated with the next display line to be updated following the sensing period 320 (e.g., display line 5 in FIG. 5B) may be converted and stored prior to entering the sensing period 320. For example, the source lines may be driven with source line data associated with display line N during the sensing period 320, and source line data associated with display line N+1 may be stored. Accordingly, following the sensing period 320, display line N+1 can be driven without waiting for data conversion delays (e.g., a digital-to-analog conversion delay). However, due to the length of the sensing period 320, the sub-pixels associated with display line N+1 may drift above or below the expected values. For example, when a positive voltage is applied to the sub-pixels associated with display line N+1 during the sensing period 320 and/or restart period 510, voltage may build up on the sub-pixels. As a result, after the sensing period 320, the sub-pixels may have drifted above the expected values, producing a display artifact when display line N+1 is updated. In various embodiments, the likelihood of producing display artifacts under such circumstances may be reduced by driving the source lines (e.g., during the sensing period 320 and/or restart period 510) so that the sub-pixels associated with display line N+1 are near the voltages that would have been expected if a sensing period 320 had not occurred. In other embodiments, the likelihood of producing display artifacts under such circumstances may be reduced by driving the source lines with signals that are based on inverted versions of the signals driven when updating display line N (i.e., the display line driven for updating prior to the sensing period 320).

Figure 6:
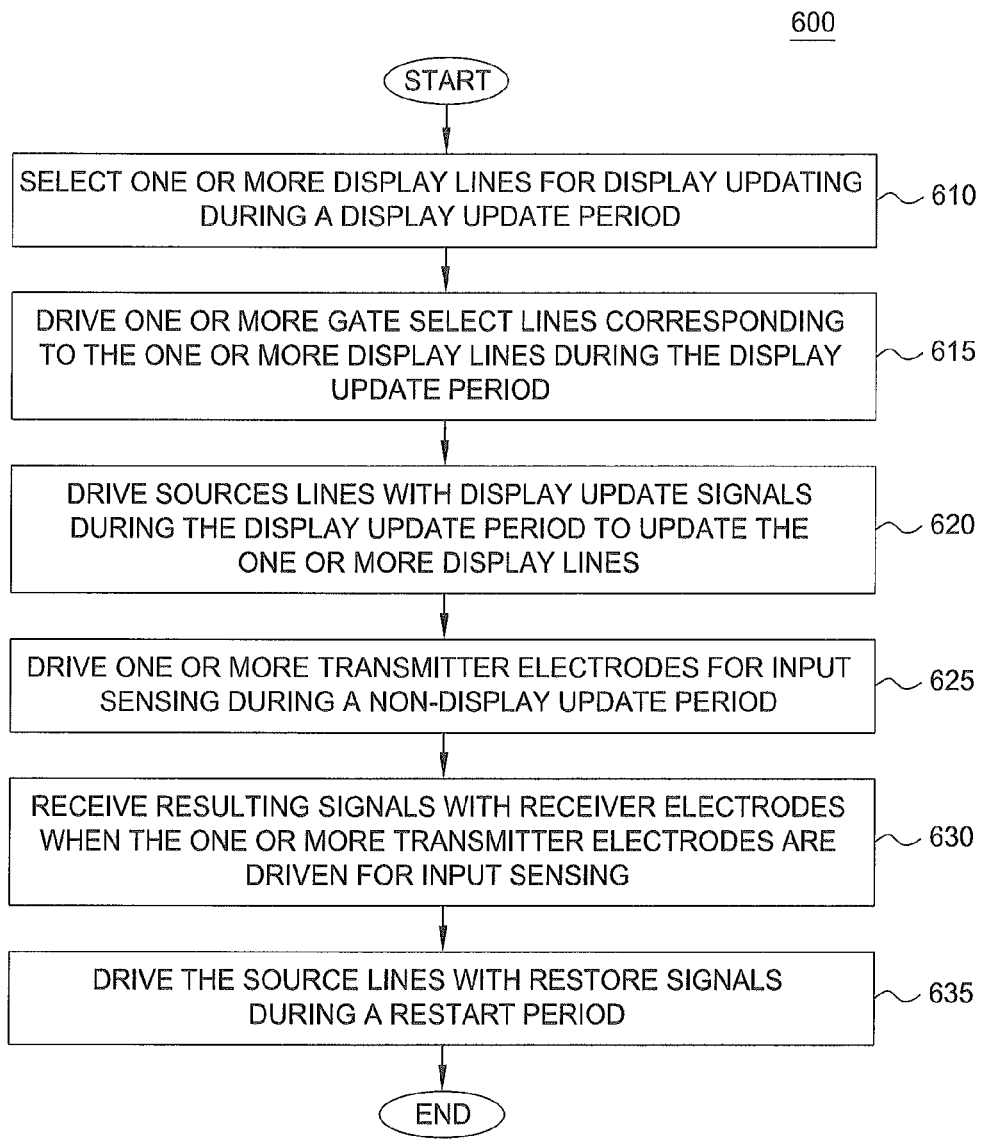
FIG. 6 is a flow chart of a method for restoring display elements of the input device to a desired state following a non-display update period in accordance with embodiments of the invention.

FIG. 6 is a flow chart of a method 600 for restoring display elements of the input device 100 to a desired state following a non-display update period in accordance with embodiments of the invention. Although the method 600 is described in conjunction with FIGS. 1-5B, persons skilled in the art will understand that any system configured to perform the method, in any appropriate order, falls within the scope of the present invention.

The method 600 begins at step 610, where one or more display lines are selected for display updating during a first display update period. At step 615, one or more gate select lines, corresponding to the one or more display lines, are driven with select signals during the first display update period. Next, once the one or more display lines have been selected, the source lines are driven with display update signals (e.g., pixel values) at step 620 to update the one or more display lines. As described above with respect to FIGS. 4, 5A and 5B, the display lines may be selected using a pipelined technique. As such, the gate select lines may be driven with select signals in a sequential and overlapping manner, and the source lines may be driven with display update signals in a sequential manner, during the first display update period.

At step 625, one or more transmitter electrodes 210 are driven for input sensing during a non-display update period (e.g., sensing period 320). Then, at step 630, resulting signals are received with the receiver electrodes 220 and utilized to detect the presence (or absence) of an input object 140 in the sensing region 120.

Finally, at step 635, following the non-display update period, one or more types of display elements (e.g., the source lines) are driven with restore signals during a restart period 510. As described above with respect to FIGS. 5A and 5B, the restore signals may be based on the display update signals driven to the source lines in step 620. That is, the restore signals may be configured to place the system in a state that is similar or substantially identical to the state the system was in prior to the non-display update period. Additionally, the restore signals may comprise a reference voltage, or the source lines may be coupled to a high-impedance circuit (e.g., electrically floated) during the non-display update period and/or restart period 510.

After the non-display update period and restart period 510, one or more additional display lines may be selected and updated during a second display update period according to steps 610, 615 and 620.

FIGS. 7A-7D illustrate the conversion and storage of source line data values during the sensing period 320 and restart period 510 in accordance with embodiments of the invention. Source line data values may be converted, stored, and/or driven to source lines using a digital-to-analog converter (DAC), such as, for example, a cyclic DAC, a resistor network (e.g., resistor string), or a delta-sigma DAC. The DAC may convert pixel data for one display line at a time and may include two or more capacitors for storing converted values. The conversion time for each analog value is fixed and may be shorter than a display line update time period. If the conversion time is too short, an incorrect analog value may be produced. Consequently, the conversion and storage of source line data values may be configured such that sufficient conversion times are observed and display line data is available when needed.

Figures 7A, 7B:
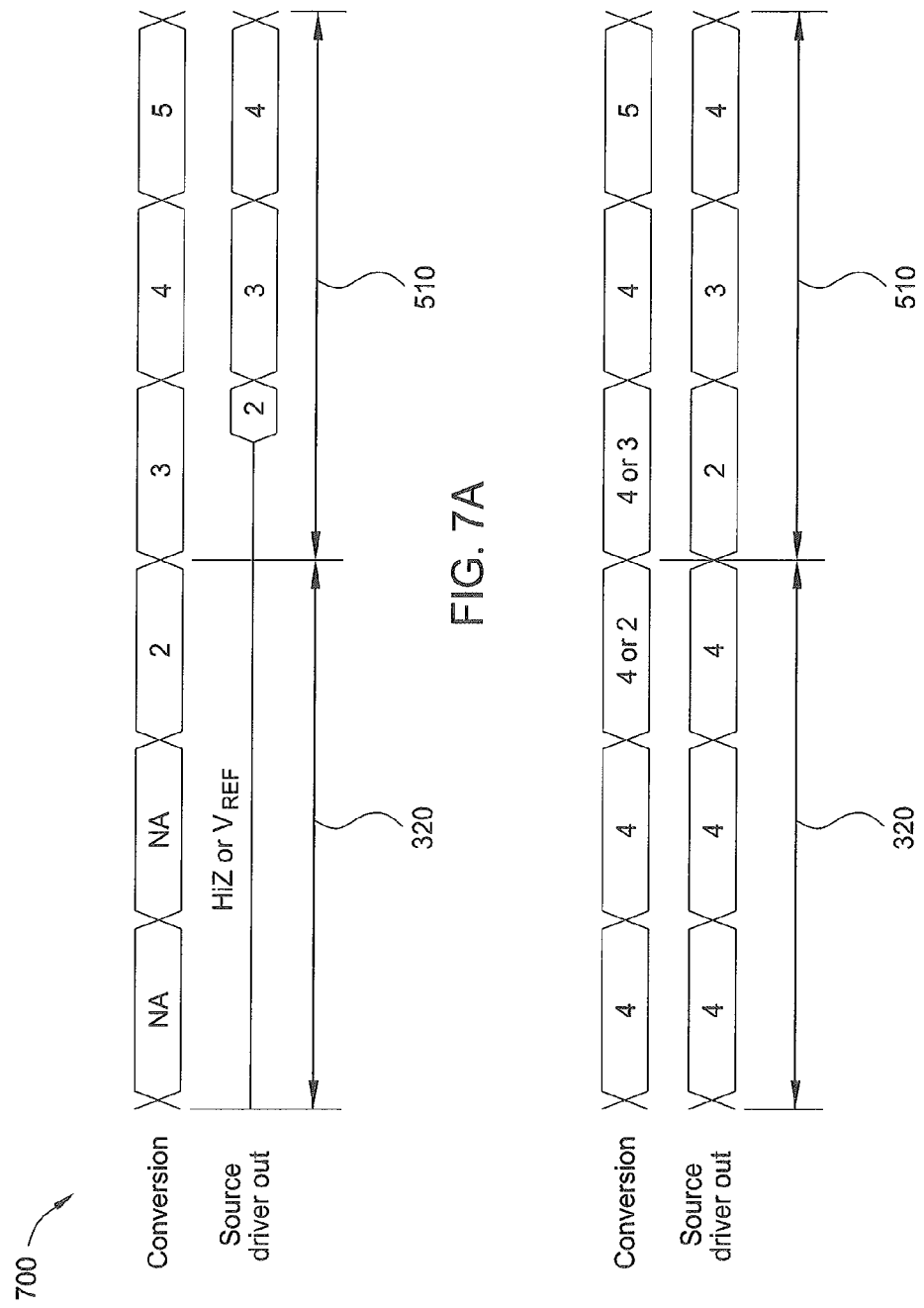

FIG. 7A illustrates an embodiment in which the source lines are coupled to a high-impedance circuit and/or driven with a reference voltage (e.g., a V-com voltage) during the sensing period 320 and/or during a portion of the restart period 510. The source lines are then driven with the source line data for the last three display lines during the restart period 510. Additionally, as shown, conversion of source line data associated with display line 2 may begin during the sensing period 320 so that the data is available at the start of the restart period 510.

FIG. 7B illustrates an embodiment in which the source lines are driven with source line data associated with display line N (i.e., the last display line driven prior to the sensing period 320) during the sensing period 320. The source lines are then driven with the source line data for the last three display lines during the restart period 510. As shown, conversion of source line data associated with display line 2 may begin during the sensing period 320.

FIGS. 7C and 7D illustrate embodiments in which the source lines are driven with source line data associated with display line N (i.e., the last display line driven prior to the sensing period 320) during the sensing period 320. The source lines are then driven with the source line data for the last three display lines and/or coupled to a high-impedance circuit during the restart period 510. In both embodiments, conversion of source line data associated with display line 2 may begin during the sensing period 320.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for a display device having an integrated sensing device, the processing system comprising:
   a driver module comprising driver circuitry, the driver module coupled to a plurality of source lines and a plurality of transmitter electrodes, each transmitter electrode comprising one or more common electrodes configured for display updating and input sensing, the driver module configured for:
      selecting a first display line for display updating during a first display update period;
      driving the sources lines with first display update signals during the first display update period to update the first display line;
      driving a first transmitter electrode of the plurality of transmitter electrodes for input sensing during a non-display update period; and
      driving the source lines with restore signals during a restart period, wherein the restart period is after the non-display update period and before a second display update period; and
   a receiver module coupled to a plurality of receiver electrodes and configured for receiving resulting signals with the receiver electrodes when the first transmitter electrode is driven for input sensing.

2. The processing system of claim 1, wherein the restore signals are based on the first display update signals.

3. The processing system of claim 1, wherein the restart period at least partially overlaps with the non-display update period.

4. The processing system of claim 1, wherein the restore signals comprise a reference voltage.

5. The processing system of claim 1, wherein driving the source lines with the restore signals comprises electrically floating the source lines.

6. The processing system of claim 1, wherein the driver module is further configured for:
   selecting a second display line for display updating during a second display update period following the first display update period and before the non-display update period; and
   driving the sources lines with second display update signals during the second display update period.

7. The processing system of claim 6, wherein the non-display update period is at least as long as a total display update period comprising the first display update period and the second display update period.

8. The processing system of claim 6, wherein the driver module is further configured for:
   driving a first gate select line corresponding to the first display line during the first display update period; and
   driving a second gate select line corresponding to a second display line during the second display update period, wherein driving the first gate select line is at least partially concurrent with driving the second gate select line.

9. The processing system of claim 6, wherein the restore signals comprise the first display update signals and the second display update signals, and driving the source lines with the restore signals comprises driving the sources lines with the first display update signals and then driving the source lines with the second display update signals.

10. The processing system of claim 1, wherein selecting the first common electrode for display updating comprises driving a select signal to a plurality of amorphous silicon transistors.

11. A method of input sensing with a display device integrated with a sensing device having a plurality of source lines, a plurality of receiver electrodes, and a plurality of transmitter electrodes, each transmitter electrode comprising one or more common electrodes, the method comprising:
   selecting a first display line for display updating during a first display update period;
   driving the sources lines with first display update signals during the first display update period to update the first display line;
   driving a first transmitter electrode of the plurality of transmitter electrodes for input sensing during a non-display update period;
   receiving resulting signals with the receiver electrodes when the first transmitter electrode is driven for input sensing;
   driving the source lines with restore signals during a restart period, wherein the restart period is after the non-display update period and before a second display update period.

12. The method of claim 11, wherein the restore signals are based on the first display update signals.

13. The method of claim 11, wherein the restore signals comprise a reference voltage.

14. The method of claim 11, further comprising:
   selecting a second display line for display updating during a second display update period following the first display update period and before the non-display update period; and
   driving the sources lines with second display update signals during the second display update period.

15. The method of claim 14, further comprising:
   driving a first gate select line corresponding to the first display line during the first display update period; and
   driving a second gate select line corresponding to a second display line during the second display update period, wherein driving the first gate select line is at least partially concurrent with driving the second gate select line.

16. An input device comprising a display device having an integrated sensing device, the input device comprising:
   a plurality of source lines;
   a plurality of transmitter electrodes, each transmitter electrode comprising one or more common electrodes configured for display updating and input sensing;
   a plurality of receiver electrodes; and
   a processing system coupled to the source lines, transmitter electrodes, and receiver electrodes, the processing system configured to:
      select a first display line for display updating during a first display update period;
      drive the sources lines with first display update signals during the first display update period to update the first display line;
      drive a first transmitter electrode of the plurality of transmitter electrodes for input sensing during a non-display update period;
      receive resulting signals with the receiver electrodes when the first transmitter electrode is driven for input sensing; and
      drive the source lines with restore signals during a restart period, wherein the restart period is after the non-display update period and before a second display update period.

17. The input device of claim 16, wherein the restore signals are based on the first display update signals.

18. The input device of claim 16, wherein the restore signals comprise a reference voltage.

19. The input device of claim 16, wherein the processing system is further configured to:
- select a second display line for display updating during a second display update period following the first display update period and before the non-display update period; and
- drive the sources lines with second display update signals during the second display update period.

20. The input device of claim 19, wherein the processing system is further configured to:
- drive a first gate select line corresponding to the first display line during the first display update period; and
- drive a second gate select line corresponding to a second display line during the second display update period, wherein driving the first gate select line is at least partially concurrent with driving the second gate select line.

* * * * *